US012271842B2

(12) United States Patent
Iwamoto et al.

(10) Patent No.: US 12,271,842 B2
(45) Date of Patent: Apr. 8, 2025

(54) DELIVERY SYSTEM, CONTROL METHOD OF DELIVERY SYSTEM, AND STORAGE MEDIUM

(71) Applicant: TOYOTA JIDOSHA KABUSHIKI KAISHA, Toyota (JP)

(72) Inventors: Kunihiro Iwamoto, Toyota (JP); Yuta Itozawa, Nagoya (JP); Hirotaka Komura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 18/125,807

(22) Filed: Mar. 24, 2023

(65) Prior Publication Data
US 2024/0005227 A1 Jan. 4, 2024

(30) Foreign Application Priority Data

Jun. 29, 2022 (JP) ................................ 2022-104164

(51) Int. Cl.
*B60P 3/07* (2006.01)
*B60L 58/13* (2019.01)
*B60W 60/00* (2020.01)
*G05D 1/00* (2024.01)
*G06Q 10/0631* (2023.01)
*G06Q 10/0832* (2023.01)

(52) U.S. Cl.
CPC ........ *G06Q 10/06311* (2013.01); *B60L 58/13* (2019.02); *B60P 3/07* (2013.01); *B60W 60/00256* (2020.02); *G05D 1/0287* (2013.01); *G06Q 10/0832* (2013.01); *B60L 2200/36* (2013.01)

(58) Field of Classification Search
None
See application file for complete search history.

(56) References Cited

U.S. PATENT DOCUMENTS

| 3,466,791 A * | 9/1969 | Einfalt | A63H 18/14 446/427 |
| 9,142,978 B2 * | 9/2015 | Juhasz | B60L 53/665 |
| 2007/0038506 A1 * | 2/2007 | Noble | G06Q 50/40 705/13 |
| 2012/0109409 A1 | 5/2012 | Hara | |

(Continued)

FOREIGN PATENT DOCUMENTS

| JP | H11-285109 A | 10/1999 |
| JP | 2010-092321 A | 4/2010 |

(Continued)

*Primary Examiner* — Folashade Anderson
(74) *Attorney, Agent, or Firm* — Oliff PLC

(57) ABSTRACT

A delivery system includes a plurality of delivery vehicles for delivering an article to a delivery destination with power charged in a battery that is able to be charged and discharged. The delivery vehicles are able to be charged with each other. A charging schedule including a combination of a charging vehicle and a vehicle to be charged selected from the delivery vehicles is determined based on a delivery schedule of the article and a remaining charge capacity of the battery for each of the delivery vehicles, and the delivery schedule for the charging vehicle and the vehicle to be charged is updated based on the charging schedule.

5 Claims, 3 Drawing Sheets

(56) References Cited

U.S. PATENT DOCUMENTS

| | | | |
|---|---|---|---|
| 2013/0020993 A1* | 1/2013 | Taddeo | B60L 53/65 |
| | | | 320/109 |
| 2017/0022955 A1* | 1/2017 | Steele | F02N 11/0866 |
| 2017/0226764 A1* | 8/2017 | Nussbaum | E04H 6/24 |
| 2019/0009756 A1* | 1/2019 | Jacobs | B60L 53/80 |
| 2019/0011926 A1* | 1/2019 | Konishi | G01C 21/3476 |
| 2019/0132719 A1 | 5/2019 | Mizutani et al. | |
| 2019/0351783 A1* | 11/2019 | Goei | B60L 53/63 |
| 2021/0165404 A1* | 6/2021 | Gillett | G01C 21/3691 |
| 2023/0118740 A1 | 4/2023 | Iguchi et al. | |
| 2024/0166068 A1* | 5/2024 | La Vigne | B60L 53/302 |

FOREIGN PATENT DOCUMENTS

| | | |
|---|---|---|
| JP | 2012108870 A | 6/2012 |
| JP | 2019-86842 A | 6/2019 |
| JP | 2020-90151 A | 6/2020 |
| JP | 2022-11804 A | 1/2022 |

\* cited by examiner

DELIVERY SYSTEM, CONTROL METHOD OF DELIVERY SYSTEM, AND STORAGE MEDIUM

CROSS-REFERENCE TO RELATED APPLICATION

This application claims priority to Japanese Patent Application No. 2022-104164 filed on Jun. 29, 2022, incorporated herein by reference in its entirety.

BACKGROUND

1. Technical Field

The present disclosure relates to a delivery system, a control method of the delivery system, and a storage medium.

2. Description of Related Art

Japanese Unexamined Patent Application Publication No. 2010-092321 (JP 2010-092321 A) discloses a transport system using an autonomously moving transport vehicle in a production line. In JP 2010-092321 A, a charging operation is assigned to each transport vehicle based on the remaining charge capacity of the transport vehicle.

SUMMARY

In the transport system disclosed in JP 2010-092321 A, it is necessary for the transport vehicle to travel to a charging station and charge a battery.
Therefore, when JP 2010-092321 A is applied to a delivery system using a delivery vehicle for delivering an article, each delivery vehicle travels to the charging station and charges the battery, resulting in loss of time and energy. As a result, there is a problem that the transport system as a whole is less efficient in terms of time and energy.

The present disclosure has been made in view of such circumstances, and provides a delivery system capable of reducing the loss of time and energy caused by the delivery vehicle for delivering the article traveling to the charging station and charging the battery.

A delivery system according to an aspect of the present disclosure is a delivery system including a plurality of delivery vehicles for delivering an article to a delivery destination with power charged in a battery that is able to be charged and discharged, in which
   the delivery vehicles are able to be charged with each other,
   a charging schedule including a combination of a charging vehicle and a vehicle to be charged selected from the delivery vehicles is determined based on a delivery schedule of the article and a remaining charge capacity of the battery for each of the delivery vehicles, and
   the delivery schedule for the charging vehicle and the vehicle to be charged is updated based on the charging schedule.

Further, a control method of a delivery system according to an aspect of the present disclosure is a control method of a delivery system including a plurality of delivery vehicles for delivering an article to a delivery destination with power charged in a battery that is able to be charged and discharged, in which
   the delivery vehicles are able to be charged with each other, and
   a computer executes processes including
   determining a charging schedule including a combination of a charging vehicle and a vehicle to be charged selected from the delivery vehicles based on a delivery schedule of the article and a remaining charge capacity of the battery for each of the delivery vehicles, and
   updating the delivery schedule for the charging vehicle and the vehicle to be charged based on the charging schedule.

Further, a storage medium according to an aspect of the present disclosure stores a control program. The control program is a control program for causing a computer to control a delivery system including a plurality of delivery vehicles for delivering an article to a delivery destination with power charged in a battery that is able to be charged and discharged, in which
   the delivery vehicles are able to be charged with each other, and
   the control program causes the computer to execute processes including
   determining a charging schedule including a combination of a charging vehicle and a vehicle to be charged selected from the delivery vehicles based on a delivery schedule of the article and a remaining charge capacity of the battery for each of the delivery vehicles, and
   updating the delivery schedule for the charging vehicle and the vehicle to be charged based on the charging schedule.

As described above, according to an aspect of the present disclosure, the charging schedule including the combination of the charging vehicle and the vehicle to be charged selected from the delivery vehicles is determined based on the delivery schedule of the article and the remaining charge capacity of the battery for each of the delivery vehicles that can be charged with each other, and the delivery schedule for the charging vehicle and the vehicle to be charged is updated based on the charging schedule. Therefore, it is possible to reduce loss of time and energy caused by each delivery vehicle traveling to the charging station and charging the battery.

The delivery vehicles may be autonomously moving vehicles.
Further, each of the charging vehicle and the vehicle to be charged may be loaded on a separate transport vehicle, be transported toward a delivery destination of the article, be unloaded from the transport vehicle, and deliver the article to the delivery destination.

According to the present disclosure, it is possible to provide a delivery system capable of reducing the loss of time and energy caused by the delivery vehicle for delivering the article traveling to the charging station and charging the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a specific embodiment will be described in detail with reference to the drawings. In each drawing, the same or corresponding elements are designated by the same reference signs, and duplicate explanations are omitted as necessary to clarify the explanations.

First Embodiment

Configuration of Delivery System

Figure 1:
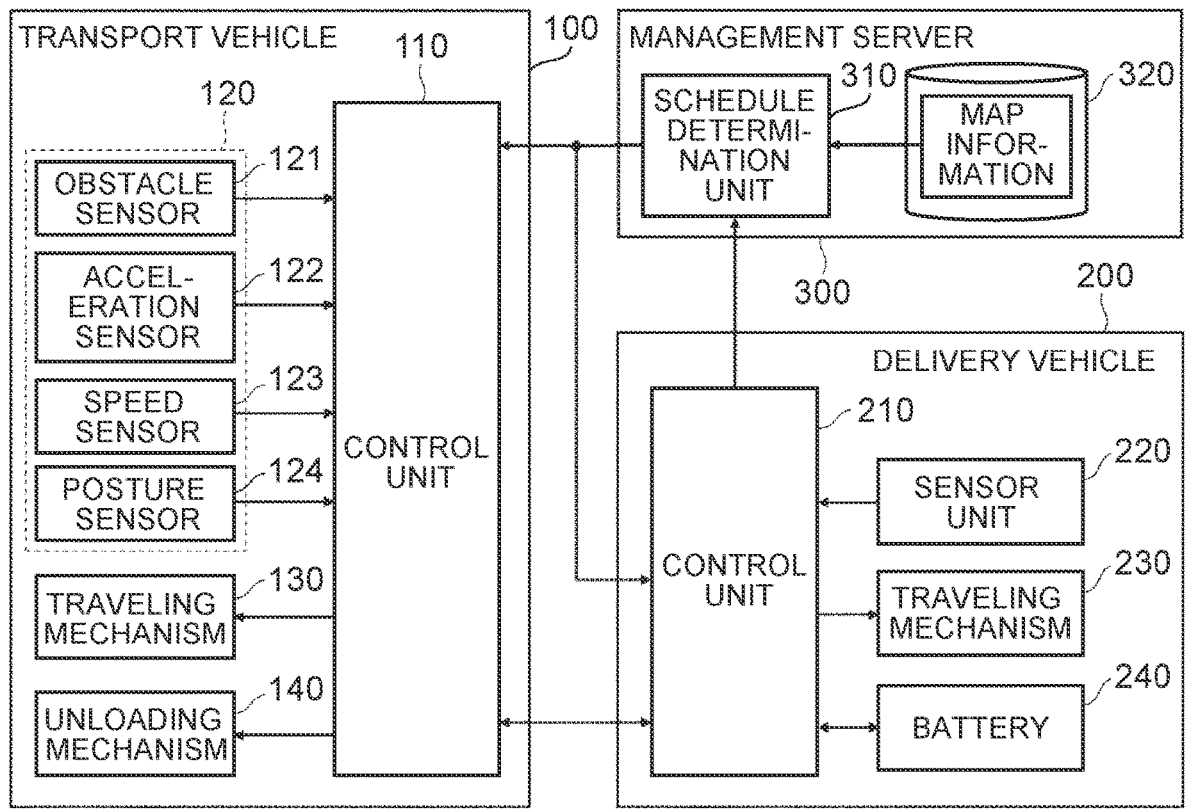
FIG. 1 is a block diagram of a delivery system according to a first embodiment.

First, referring to FIG. 1, a delivery system and a control method thereof according to a first embodiment will be described. FIG. 1 is a block diagram of the delivery system according to the first embodiment. As shown in FIG. 1, the delivery system according to the present embodiment includes a transport vehicle 100, a delivery vehicle 200, and a management server 300.

Although not particularly limited, in the present embodiment, after the transport vehicle 100 that loads the delivery vehicle 200 travels toward a delivery destination of an article, the delivery vehicle 200 is unloaded from the transport vehicle 100 and delivers the article to the delivery destination. That is, the transport vehicle 100 is not essential, and the article may be delivered only by the delivery vehicle 200.

First, the transport vehicle 100 will be described.

The transport vehicle 100 loads and transports the delivery vehicle 200. The transport vehicle 100 in the present embodiment is an autonomously moving vehicle (that is, an autonomous driving vehicle), but may be a manual driving vehicle. As shown in FIG. 1, the transport vehicle 100 includes a control unit 110, a sensor unit 120, a traveling mechanism 130, and an unloading mechanism 140. In addition, the transport vehicle 100 is wirelessly connected to the delivery vehicle 200 and the management server 300 so as to be able to communicate with each other.

When the management server 300 is mounted on the transport vehicle 100, the transport vehicle 100 may be connected to the management server 300 by wire. Further, although only one delivery vehicle 200 is shown in FIG. 1, a plurality of the delivery vehicles 200 may be loaded on the transport vehicle 100.

The control unit 110 controls the traveling mechanism 130 based on various kinds of information acquired from the sensor unit 120. As a result, the transport vehicle 100 travels. Further, the control unit 110 controls the unloading mechanism 140 for unloading the delivery vehicle 200.

The control unit 110 includes an arithmetic unit such as a central processing unit (CPU), and a storage unit such as a random-access memory (RAM) and a read-only memory (ROM) storing various control programs and data. That is, the control unit 110 has a function as a computer, and executes a process for controlling the traveling mechanism 130 and the unloading mechanism 140 based on the various control programs and the like described above.

In the example shown in FIG. 1, the sensor unit 120 includes an obstacle sensor 121, an acceleration sensor 122, a speed sensor 123, and a posture sensor 124. The obstacle sensor 121 detects an obstacle ahead of the transport vehicle 100 in a traveling direction. Further, the obstacle sensor 121 detects an obstacle when the delivery vehicle 200 is unloaded from the transport vehicle 100. The obstacle sensor 121 is, for example, a radar sensor, a sonar sensor, an ultrasonic sensor, a light detection and ranging (LiDAR) sensor, a camera, or the like. The obstacle includes, for example, not only a falling object on a road and other vehicles, but also people such as pedestrians and animals.

The acceleration sensor 122 detects acceleration of the transport vehicle 100. By detecting the acceleration of the transport vehicle 100, the vibration of the transport vehicle 100 caused by unevenness of a road surface can also be detected.

The speed sensor 123 detects a speed of the transport vehicle 100.

The posture sensor 124 detects a posture of the transport vehicle 100. The posture sensor 124 can detect a gradient of the road on which the transport vehicle 100 is traveling.

The traveling mechanism 130 is a mechanism for causing the transport vehicle 100 to travel. For example, the traveling mechanism 130 includes a braking mechanism for stopping the transport vehicle 100 and a steering mechanism for turning the transport vehicle 100, in addition to a driving mechanism such as a motor and an engine for causing the transport vehicle 100 to travel.

Figure 2:
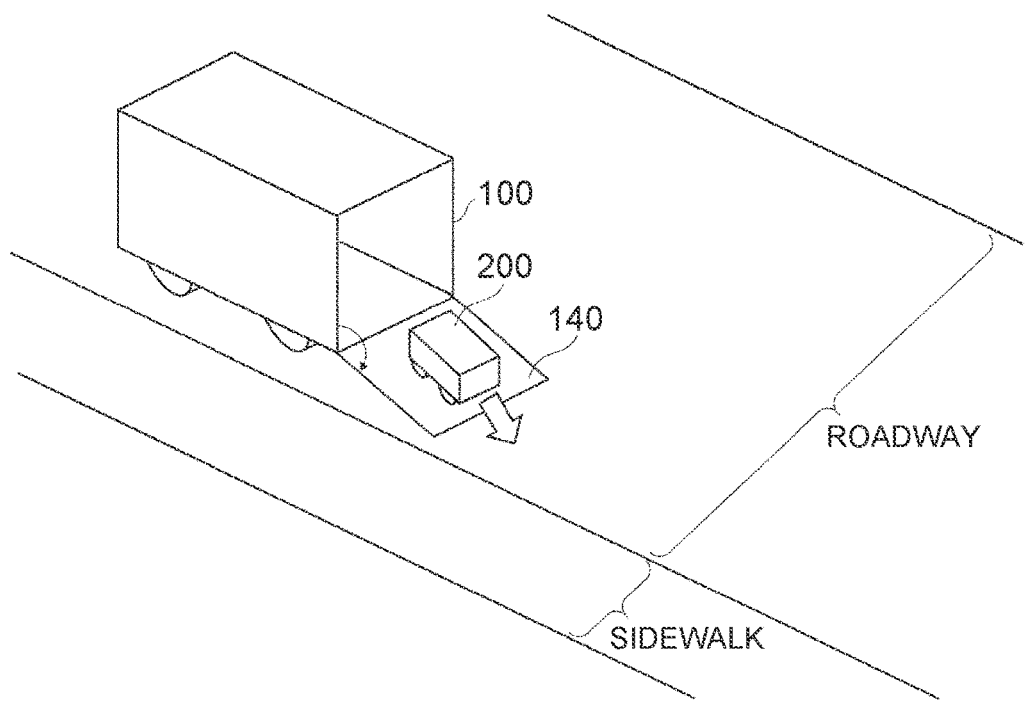
FIG. 2 is a perspective view showing a state in which a delivery vehicle 200 is unloaded from a transport vehicle 100.
Figure 3:
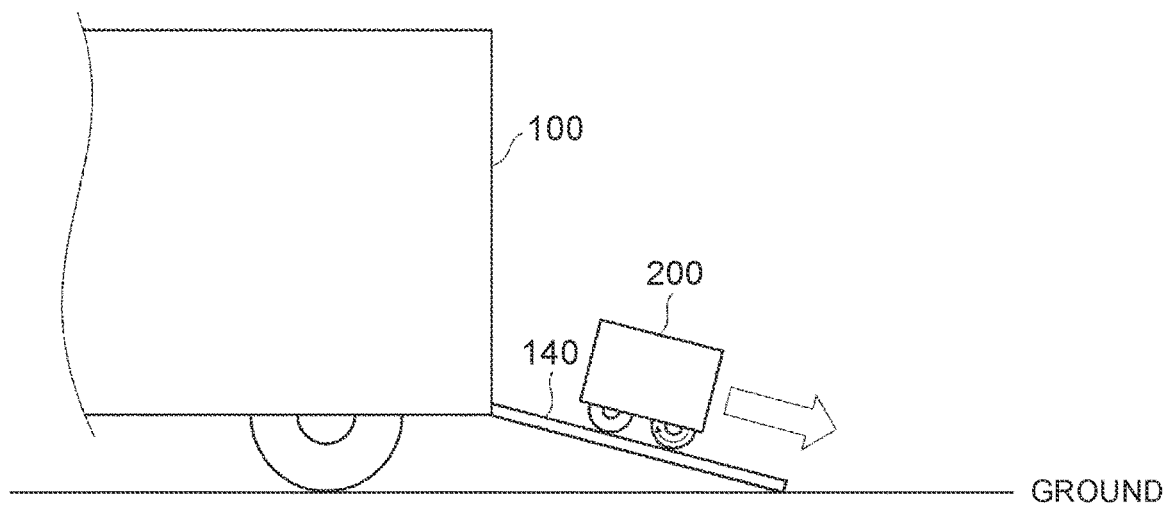
FIG. 3 is a side view showing a state in which the delivery vehicle 200 is unloaded from the transport vehicle 100.

The unloading mechanism 140 is a mechanism for unloading the delivery vehicle 200 from the transport vehicle 100. Here, referring to FIGS. 2 and 3, an example of the unloading mechanism 140 will be described. FIG. 2 is a perspective view showing a state in which the delivery vehicle 200 is unloaded from the transport vehicle 100. FIG. 3 is a side view showing a state in which the delivery vehicle 200 is unloaded from the transport vehicle 100.

As shown in FIGS. 2 and 3, the unloading mechanism 140 according to the present embodiment is a simple plate-shaped slope. In the example shown in FIGS. 2 and 3, the unloading mechanism 140 also functions as an opening-closing door provided on the rear side of the transport vehicle 100. The unloading mechanism 140 is connected to one side of the lower end portion of an opening provided on the rear side of the transport vehicle 100. Normally, the unloading mechanism 140 is closed as the opening-closing door. On the other hand, when the delivery vehicle 200 is unloaded, the unloading mechanism 140 is opened as the opening-closing door, and functions as a slope extending from the inside of the transport vehicle 100 to a ground.

For example, when the delivery vehicle 200 is unloaded from the transport vehicle 100 to deliver the article, as shown in FIG. 1, an instruction for unloading the delivery vehicle 200 is made to a control unit 210 of the delivery vehicle 200 from the control unit 110 of the transport vehicle 100. At that time, the control unit 110 of the transport vehicle 100 controls the unloading mechanism 140. Specifically, as shown in FIGS. 2 and 3, the control unit 110 opens the unloading mechanism 140 functioning as the opening-closing door such that the opening-closing door functions as the slope extending from the inside of the transport vehicle 100 to the ground. Then, as shown in FIGS. 2 and 3, the delivery vehicle 200 travels on the unloading mechanism 140 and is unloaded on a roadway. Further, the article is delivered to the delivery destination, for example, via a sidewalk from the roadway.

The unloading mechanism 140 shown in FIGS. 2 and 3 may be provided separately from the opening-closing door provided at the rear side of the transport vehicle 100 as long as it functions as the slope. In that case, the unloading mechanism 140 is normally accommodated, for example, under the floor of the transport vehicle 100. Further, the unloading mechanism 140 shown in FIGS. 2 and 3 is merely an example, and is not particularly limited as long as it is a mechanism for unloading the delivery vehicle 200 from the transport vehicle 100. The unloading mechanism 140 may be, for example, a conveyor, a crane, or the like.

Next, the delivery vehicle 200 will be described. Although only one delivery vehicle 200 is described in FIGS. 1 to 3, the delivery system according to the present embodiment includes a plurality of the delivery vehicles 200 that can be charged with each other. Each delivery vehicle 200 is, for example, an autonomously moving vehicle that is transported by a separate transport vehicle 100, is unloaded from the transport vehicle 100, and delivers the article to the delivery destination. The delivery vehicle 200 may be a manual driving vehicle.

As shown in FIG. 1, the delivery vehicle 200 includes the control unit 210, a sensor unit 220, a traveling mechanism 230, and a battery 240. In addition, the delivery vehicle 200 is wirelessly connected to the transport vehicle 100 and the management server 300 so as to be able to communicate with each other. When the management server 300 is mounted on the delivery vehicle 200, the delivery vehicle 200 may be connected to the management server 300 by wire.

The control unit 210 controls the traveling mechanism 230 based on various kinds of information acquired from the sensor unit 220. That is, the control unit 210 controls the traveling mechanism 230, so that the delivery vehicle 200 travels. Here, the sensor unit 220 includes various sensors similarly to the sensor unit 120 of the transport vehicle 100.

Similarly to the control unit 110 of the transport vehicle 100, the control unit 210 includes, for example, an arithmetic unit such as a CPU, and a storage unit such as a RAM and a ROM storing various control programs and data. That is, the control unit 210 has a function as a computer, and executes a process for controlling the traveling mechanism 230 based on the various control programs and the like described above.

The control unit 210 acquires a delivery schedule (including a delivery route, delivery time, etc.) for delivering the article from the management server 300, and the delivery vehicle 200 delivers the article based on the acquired delivery schedule. On the other hand, based on the delivery schedule acquired from the management server 300 and the remaining charge capacity of the battery 240, the control unit 210 calculates the excess or deficiency of the remaining charge capacity of the delivery vehicle 200 with respect to the delivery schedule, and transmits the calculation result to the management server 300.

The traveling mechanism 230 is a mechanism for causing the delivery vehicle 200 to travel. For example, the traveling mechanism 230 includes a braking mechanism for stopping the delivery vehicle 200 and a steering mechanism for turning the delivery vehicle 200, in addition to a driving mechanism such as a motor and an engine for causing the delivery vehicle 200 to travel.

The battery 240 is a secondary battery that can be charged and discharged such as a lithium ion battery. The battery 240 is a power supply device that supplies a power source (electricity) to the control unit 210, the sensor unit 220, and the traveling mechanism 230. That is, with the power charged in the battery 240, the delivery vehicle 200 delivers the article to the delivery destination.

Next, the management server 300 will be described.

The management server 300 is a server that communicates with the transport vehicle 100 and the delivery vehicle 200 and manages the delivery system. The management server 300 is, for example, a cloud server. As shown in FIG. 1, the management server 300 includes a schedule determination unit 310 and a storage unit 320.

The schedule determination unit 310 is composed of, for example, an arithmetic unit such as a CPU. As shown in FIG. 1, the schedule determination unit 310 determines the delivery schedule from the current location to the delivery destination based on map information stored in the storage unit 320. The schedule determination unit 310 then transmits the determined delivery schedule to the control unit 110 of the transport vehicle 100 and the control unit 210 of the delivery vehicle 200. Here, the map information may include road surface information.

The storage unit 320 is composed of, for example, a RAM, a ROM, etc., and stores various control programs, data, etc. in addition to the map information.

That is, the management server 300 has a function as a computer, and executes a process for managing the delivery system based on the various control programs and the like described above.

In the delivery system according to the present embodiment, the management server 300 matches another delivery vehicle 200 in which the remaining charge capacity is surplus with respect to the delivery schedule and the delivery vehicle 200 in which the remaining charge capacity is deficient with respect to the delivery schedule. The other delivery vehicle 200 in which the remaining charge capacity is surplus is a candidate for a charging vehicle for charging still another delivery vehicle 200, and the delivery vehicle 200 in which the remaining charge capacity is deficient is a candidate for a vehicle to be charged that is charged from the other delivery vehicle 200.

The schedule determination unit 310 determines a charging schedule including a combination of the charging vehicle and the vehicle to be charged based on the excess or deficiency of the remaining charge capacity of the battery 240 acquired from each delivery vehicle 200 and the delivery schedule of each delivery vehicle 200. Here, the charging schedule includes, for example, a charging location, charging time, etc., in addition to the combination of the charging vehicle and the vehicle to be charged.

For example, the schedule determination unit 310 selects a combination of the delivery vehicles 200 that approach closest to each other in the delivery schedule of the candidate for the charging vehicle and the vehicle to be charged. Then, the schedule determination unit 310 updates the delivery schedule for the selected charging vehicle and vehicle to be charged based on the charging schedule.

As described above, in the delivery system according to the present embodiment, based on the delivery schedule of the delivery vehicles 200 that can be charged with each other and the remaining charge capacity of the battery, the charging schedule including the combination of the charging vehicle and the vehicle to be charged is determined. Then, based on the charging schedule, the delivery schedule for the selected charging vehicle and vehicle to be charged is updated.

Therefore, in the delivery system according to the present embodiment, it is not necessary for each delivery vehicle 200 to travel to the charging station for charging the battery, and the loss of time and energy can be reduced.

Method for Determining Charging Schedule

Figure 4:
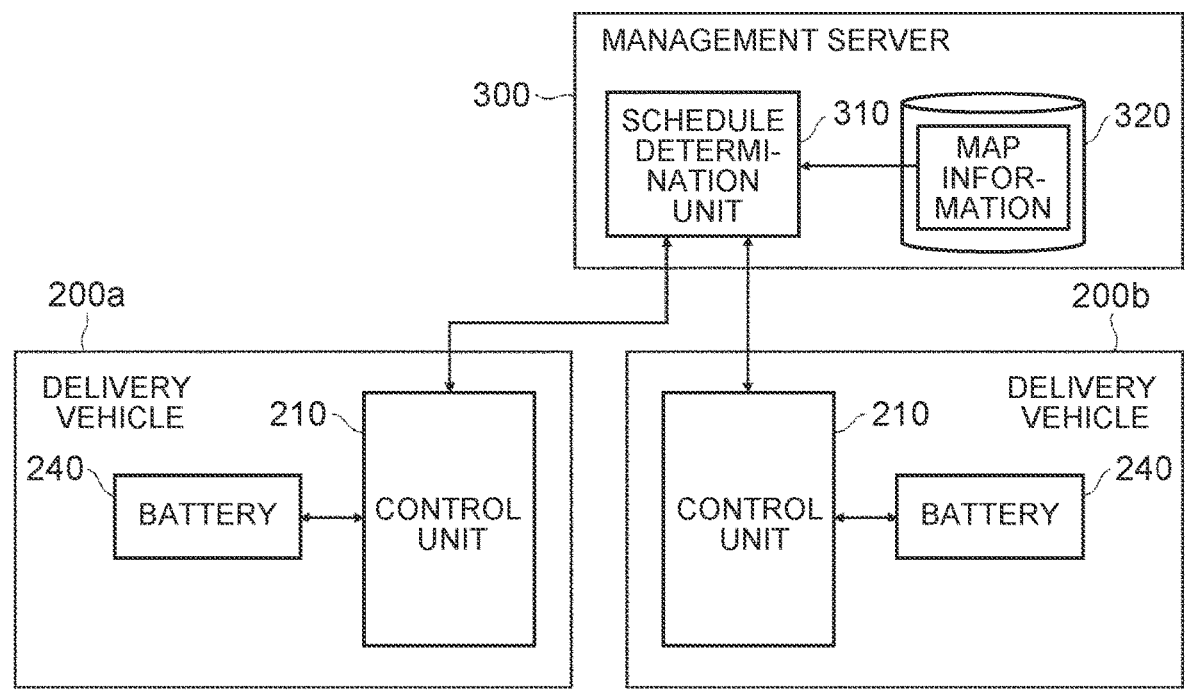
FIG. 4 is a block diagram of the delivery system according to the first embodiment.
Figure 5:
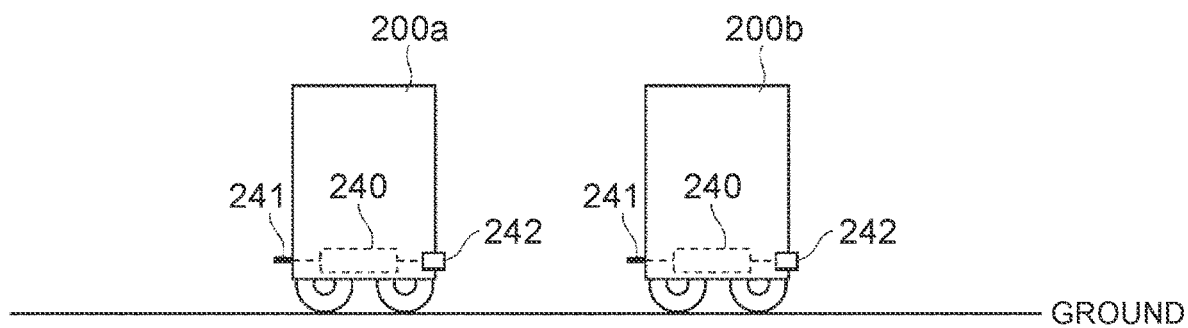
FIG. 5 is a side view showing a delivery vehicle 200a that is a charging vehicle and a delivery vehicle 200b that is a vehicle to be charged.
Figure 6:
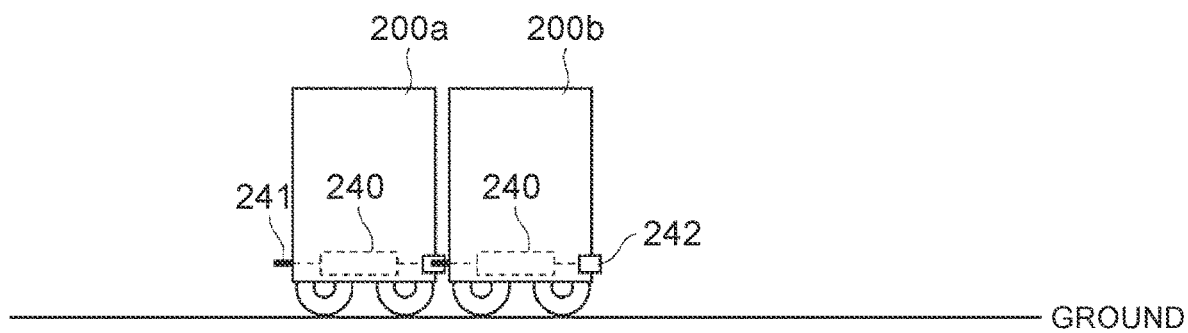
FIG. 6 is a side view showing the delivery vehicle 200a that is the charging vehicle and the delivery vehicle 200b that is the vehicle to be charged.

Next, referring to FIGS. 4 to 6, a method for determining the charging schedule will be described in detail. FIG. 4 is a block diagram of the delivery system according to the first embodiment. FIGS. 5 and 6 are each a side view showing a delivery vehicle 200*a* that is the charging vehicle and a delivery vehicle 200*b* that is the vehicle to be charged.

FIG. 4 shows only the two delivery vehicles 200*a* and 200*b* and the management server 300, and the transport vehicle 100 shown in FIG. 1 is omitted. Further, the delivery vehicles 200*a* and 200*b* each have the same configuration as the delivery vehicle 200 shown in FIG. 1. Here, in the delivery vehicles 200*a* and 200*b* shown in FIG. 4, only the control unit 210 and the battery 240 are shown, and the sensor unit 220 and the traveling mechanism 230 shown in FIG. 1 are omitted.

As described above, the control unit 210 of each of the delivery vehicles 200*a* and 200*b* acquires the delivery schedule for delivering the articles from the management server 300 and acquires the remaining charge capacity from the battery 240. Based on the delivery schedule acquired from the management server 300 and the remaining charge capacity of the battery 240, the control unit 210 of each of the delivery vehicles 200*a* and 200*b* calculates the excess or deficiency of the remaining charge capacity with respect to the delivery schedule, and transmits the calculation result to the schedule determination unit 310.

The schedule determination unit 310 determines the charging schedule including the combination of the charging vehicle and the vehicle to be charged based on the excess or deficiency of the remaining charge capacity of the battery 240 acquired from each of the delivery vehicles 200*a* and 200*b* and the delivery schedule of each of the delivery vehicles 200*a* and 200*b*. Here, the delivery vehicle 200*a* is a candidate for the charging vehicle because the remaining charge capacity of the battery 240 is surplus with respect to the delivery schedule. On the other hand, the delivery vehicle 200*b* is a candidate for the vehicle to be charged because the remaining charge capacity of the battery 240 is deficient with respect to the delivery schedule.

For example, among the candidates for the charging vehicle, the delivery vehicle 200*a* approaches closest to the delivery vehicle 200*b* that is the candidate for the vehicle to be charged in the delivery schedule. In that case, the schedule determination unit 310 determines the charging schedule in which the delivery vehicle 200*a* is set as the charging vehicle and the delivery vehicle 200*b* is set as the vehicle to be charged.

For example, as shown in FIGS. 5 and 6, the delivery vehicles 200*a* and 200*b* each have a plug 241 and a socket 242 electrically connected to the battery 240. Then, as shown in FIG. 6, the plug 241 of the delivery vehicle 200*b* fits into the socket 242 of the delivery vehicle 200*a* and electrical connection can be performed. That is, as shown in FIG. 6, the battery 240 of the delivery vehicle 200*a* and the battery 240 of the delivery vehicle 200*b* are electrically connected, and surplus power can be supplied from the battery 240 of the delivery vehicle 200*a* to the battery 240 of the delivery vehicle 200*b*.

Although not shown, the plug 241 of the delivery vehicle 200*a* can fit into the socket 242 of the delivery vehicle 200*b* and electrical connection can be performed. Further, the plug 241 and the socket 242 shown in FIGS. 5 and 6 are merely examples, and any configuration may be adopted as long as the battery 240 of the delivery vehicle 200*a* and the battery 240 of the delivery vehicle 200*b* can be electrically connected.

As described above, in the delivery system according to the present embodiment, based on the delivery schedule of the delivery vehicles 200 that can be charged with each other and the remaining charge capacity of the battery, the charging schedule including the combination of the charging vehicle and the vehicle to be charged is determined. Then, based on the charging schedule, the delivery schedule for the selected charging vehicle and vehicle to be charged is updated.

Therefore, in the delivery system according to the present embodiment, it is not necessary for each delivery vehicle 200 to travel to the charging station for charging the battery, and the loss of time and energy can be reduced.

The program in the example described above includes a set of instructions (or software code) for causing the computer to perform one or more of the functions described in the embodiment when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD) or other memory technologies, a compact disc read-only memory (CD-ROM), a digital versatile disc (DVD), a Blu-ray (registered trademark) disc or other optical disc storages, a magnetic cassette, a magnetic tape, a magnetic disc storage, or other magnetic storage devices. The program may be transmitted on a transitory computer-readable medium or a communication medium. Examples of the transitory computer-readable medium or the communication medium include, but are not limited to, an electrical, optical, acoustic, or other form of propagating signal.

The present disclosure is not limited to the above embodiment, and can be appropriately modified without departing from the spirit.

What is claimed is:

1. A delivery system comprising:
   a plurality of delivery vehicles for delivering an article to a delivery destination, the plurality of delivery vehicles including at least an autonomously moving power supplying vehicle having a first battery and at least an autonomously moving power receiving vehicle having a second battery, the power supplying vehicle being configured to charge the second battery of the power receiving vehicle; and
   a processor programmed to determine a charging schedule including a combination of the power supplying vehicle and the power receiving vehicle based on (i) a delivery schedule of the article and (ii) a remaining charge capacity of each of the first and second batteries, wherein
   the second battery of the power receiving vehicle is charged via surplus power supplied from the first battery of the power supplying vehicle based on the determined charging schedule,
   the delivery schedule is updated based on the determined charging schedule, and
   the power receiving vehicle, having been charged by the power supplying vehicle, autonomously moves to deliver the article to the delivery destination according to the updated delivery schedule.

2. The delivery system according to claim 1, wherein each of the power supplying vehicle and the power receiving vehicle is loaded on a separate transport vehicle, is transported toward a delivery destination of the article, is unloaded from the transport vehicle, and delivers the article to the delivery destination.

3. A control method of a delivery system including a plurality of delivery vehicles for delivering an article to a delivery destination, the plurality of delivery vehicles including at least an autonomously moving power supplying vehicle having a first battery and at least an autonomously moving power receiving vehicle having a second battery, the power supplying vehicle being configured to charge the second battery of the power receiving vehicle, the method comprising:

determining a charging schedule including a combination of the power supplying vehicle and the power receiving vehicle based on (i) a delivery schedule of the article and (ii) a remaining charge capacity of each of the first and second batteries, wherein the second battery of the power receiving vehicle is charged via surplus power supplied from the first battery of the power supplying vehicle based on the determined charging schedule, the delivery schedule is updated based on the determined charging schedule, and the power receiving vehicle, having been charged by the power supplying vehicle, autonomously moves to deliver the article to the delivery destination according to the updated delivery schedule.

4. The control method according to claim 3, wherein each of the power supplying vehicle and the power receiving vehicle is loaded on a separate transport vehicle, is transported toward a delivery destination of the article, is unloaded from the transport vehicle, and delivers the article to the delivery destination.

5. A non-transitory storage medium storing a control program for causing a computer to control a delivery system including a plurality of delivery vehicles for delivering an article to a delivery destination, the plurality of delivery vehicles including at least an autonomously moving power supplying vehicle having a first battery and at least an autonomously moving power receiving vehicle having a second battery, the power supplying vehicle being configured to charge the second battery of the power receiving vehicle, wherein:

the control program causes the computer to execute processes including determining a charging schedule including a combination of the power supplying vehicle and the power receiving vehicle based on (i) a delivery schedule of the article and (ii) a remaining charge capacity of each of the battery for each of the first and second batteries, wherein the second battery of the power receiving vehicle is charged via surplus power supplied from the first battery of the power supplying vehicle based on the determined charging schedule, the delivery schedule is updated based on the determined charging schedule, and the power receiving vehicle, having been charged by the power supplying vehicle, autonomously moves to deliver the article to the delivery destination according to the updated delivery schedule.

* * * * *